US012597716B2

(12) United States Patent
Lee et al.

(10) Patent No.: US 12,597,716 B2
(45) Date of Patent: Apr. 7, 2026

(54) ANTENNA MODULE FOR A DEVICE IN MOTION

(71) Applicants: TE Connectivity Solutions GmbH, Schaffhausen (CH); Tyco Electronics AMP Korea Co., Ltd., Kyongsangbuk-Do (KR)

(72) Inventors: Chang Hyun Lee, Suwon (KR); Kiran Vanjani, Fremont, CA (US); Xing Yun, Middletown, PA (US); Jung-Hoon Kim, Suwon (KR); Dong Wook Park, Suwon (KR)

(73) Assignees: TE CONNECTIVITY SOLUTIONS G.M.B.H., Schaffhausen (CH); TYCO ELECTRONICS AMP KOREA CO., LTD., Gyeongsan-si (KR)

( * ) Notice: Subject to any disclaimer, the term of this patent is extended or adjusted under 35 U.S.C. 154(b) by 87 days.

(21) Appl. No.: 18/607,871

(22) Filed: Mar. 18, 2024

(65) Prior Publication Data

US 2024/0380128 A1 Nov. 14, 2024

Related U.S. Application Data

(60) Provisional application No. 63/500,769, filed on May 8, 2023.

(51) Int. Cl.

| | |
|---|---|
| ***H01Q 21/20*** | (2006.01) |
| ***H01Q 1/42*** | (2006.01) |
| ***H01Q 5/48*** | (2015.01) |

(52) U.S. Cl.

CPC ............. *H01Q 21/205* (2013.01); *H01Q 1/42* (2013.01); *H01Q 5/48* (2015.01)

(58) Field of Classification Search

CPC .. H01Q 1/42; H01Q 1/48; H01Q 5/48; H01Q 9/42; H01Q 21/205

See application file for complete search history.

(56) References Cited

U.S. PATENT DOCUMENTS

| | | | | |
|---|---|---|---|---|
| 11,271,316 B2 | | 3/2022 | Thevenard et al. | |
| 2015/0270605 A1* | | 9/2015 | Nilsson .................. | H01Q 21/08 343/795 |

FOREIGN PATENT DOCUMENTS

| | | | | |
|---|---|---|---|---|
| EP | 4089837 A1 * | 11/2022 | ............. | H01Q 21/24 |
| WO | WO-2009013347 A1 * | 1/2009 | ........... | H01Q 21/293 |

* cited by examiner

*Primary Examiner* — Hoang V Nguyen

(57) ABSTRACT

An antenna module is provided and includes a flexible circuit having a first antenna feed and a second antenna feed. The antenna module includes a ground plane. The antenna module includes a first antenna element coupled to the first antenna feed. The first antenna element includes a first ground short stub coupled to the ground plane. The first antenna element includes a first radiating element defining an omnidirectional radiation pattern. The first radiating element includes a first main segment extending along a first arcuate path. The antenna module includes a second antenna element coupled to the second antenna feed. The second antenna element includes a second ground short stub coupled to the ground plane. The second antenna element includes a second radiating element defining an omnidirectional radiation pattern. The second radiating element includes a second main segment extending along a second arcuate path oriented parallel to the first arcuate path. The first and second antenna elements have a transmission coefficient lower than −10 dB.

20 Claims, 11 Drawing Sheets

ANTENNA MODULE FOR A DEVICE IN MOTION

CROSS REFERENCE TO RELATED APPLICATIONS

This application claims benefit to U.S. Provisional Application No. 63/500,769, filed 8 May 2023, the subject matter of which is herein incorporated by reference in its entirety.

BACKGROUND OF THE INVENTION

The subject matter herein relates generally to antenna modules.

Wireless devices include antenna modules for wireless communication. Some devices include multiple antennas operating at different frequencies. However, the size of the device may limit the space available for placement of the antennas. The limited space affects the antennas ability to radiate effectively. The antennas can suffer low inefficiencies and high mutual coupling between different antenna ports.

A need remains for a compact wireless device having multiple antennas having high isolation between different antenna ports and high radiation efficiency for each of the antenna elements.

BRIEF DESCRIPTION OF THE INVENTION

In one embodiment, an antenna module is provided and includes a flexible circuit having a first antenna feed and a second antenna feed. The antenna module includes a ground plane. The antenna module includes a first antenna element coupled to the first antenna feed. The first antenna element includes a first ground short stub coupled to the ground plane. The first antenna element includes a first radiating element defining an omnidirectional radiation pattern. The first radiating element includes a first main segment extending along a first arcuate path. The antenna module includes a second antenna element coupled to the second antenna feed. The second antenna element includes a second ground short stub coupled to the ground plane. The second antenna element includes a second radiating element defining an omnidirectional radiation pattern. The second radiating element includes a second main segment extending along a second arcuate path oriented parallel to the first arcuate path. The first and second antenna elements have a transmission coefficient lower than −10 dB.

In another embodiment, an antenna module is provided and includes a spherical substrate having an outer surface and an inner surface defining a central cavity. The antenna module includes a flexible circuit located in the central cavity. The flexible circuit has a first antenna feed and a second antenna feed. The antenna module includes a ground plane located in the central cavity. The antenna module includes a first antenna element coupled to the first antenna feed. The first antenna element includes a first ground short stub coupled to the ground plane. The first antenna element includes a first radiating element defining an omnidirectional radiation pattern. The first radiating element includes a first main segment coupled to the spherical substrate and extending along at least one of the outer surface or the inner surface. The first main segment follows a first arcuate path. The antenna module includes a second antenna element coupled to the second antenna feed. The second antenna element includes a second ground short stub coupled to the ground plane. The second antenna element includes a second radiating element defining an omnidirectional radiation pattern. The second radiating element includes a second main segment coupled to the spherical substrate and extends along at least one of the outer surface or the inner surface. The second main segment follows a second arcuate path oriented parallel to the first arcuate path.

In a further embodiment, an antenna module is provided and includes a flexible circuit wrapped at least partially around an interior volume. The flexible circuit has a first antenna feed and a second antenna feed. The antenna module includes a ground plane wrapped at least partially around the interior volume. The antenna module includes a battery in the interior volume and electrically connected to the flexible circuit. The antenna module includes a first antenna element coupled to the first antenna feed. The first antenna element includes a first ground short stub coupled to the ground plane. The first antenna element includes a first radiating element defining an omnidirectional radiation pattern. The first radiating element includes a first main segment extending along a first arcuate path surrounding the interior volume. The antenna module includes a second antenna element coupled to the second antenna feed. The second antenna element includes a second ground short stub coupled to the ground plane. The second antenna element includes a second radiating element defining an omnidirectional radiation pattern. The second radiating element includes a second main segment extending along a second arcuate path surrounding the interior volume. The second arcuate path is oriented parallel to the first arcuate path. The first and second antenna elements have a transmission coefficient lower than −10 dB.

DETAILED DESCRIPTION OF THE INVENTION

Figure 1:
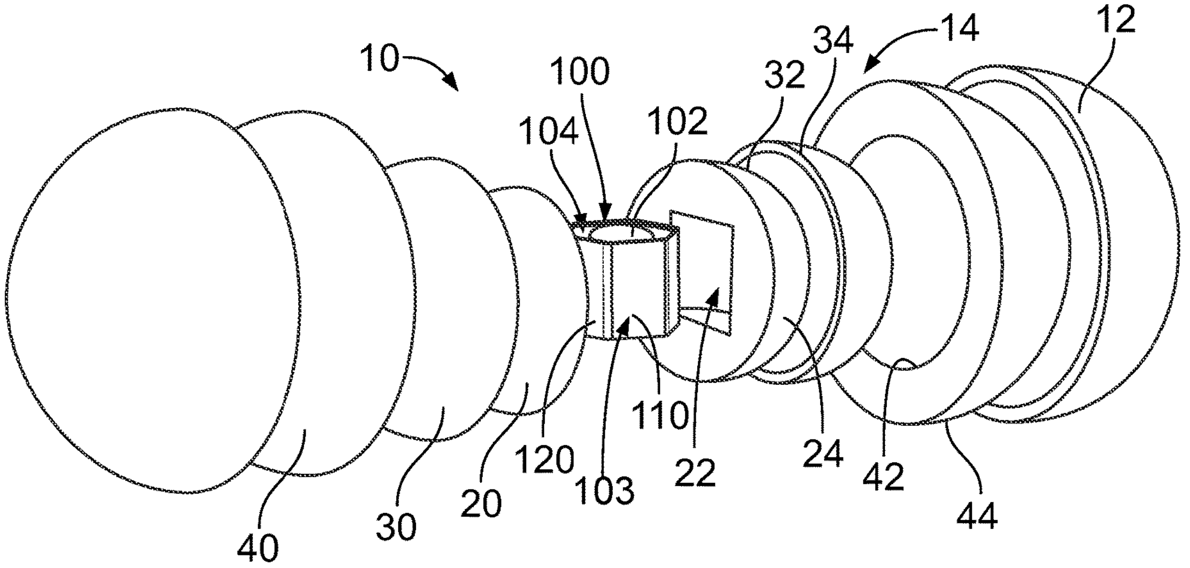
FIG. 1 is an exploded view of a device including an antenna module in accordance with an exemplary embodiment.
Figure 2:
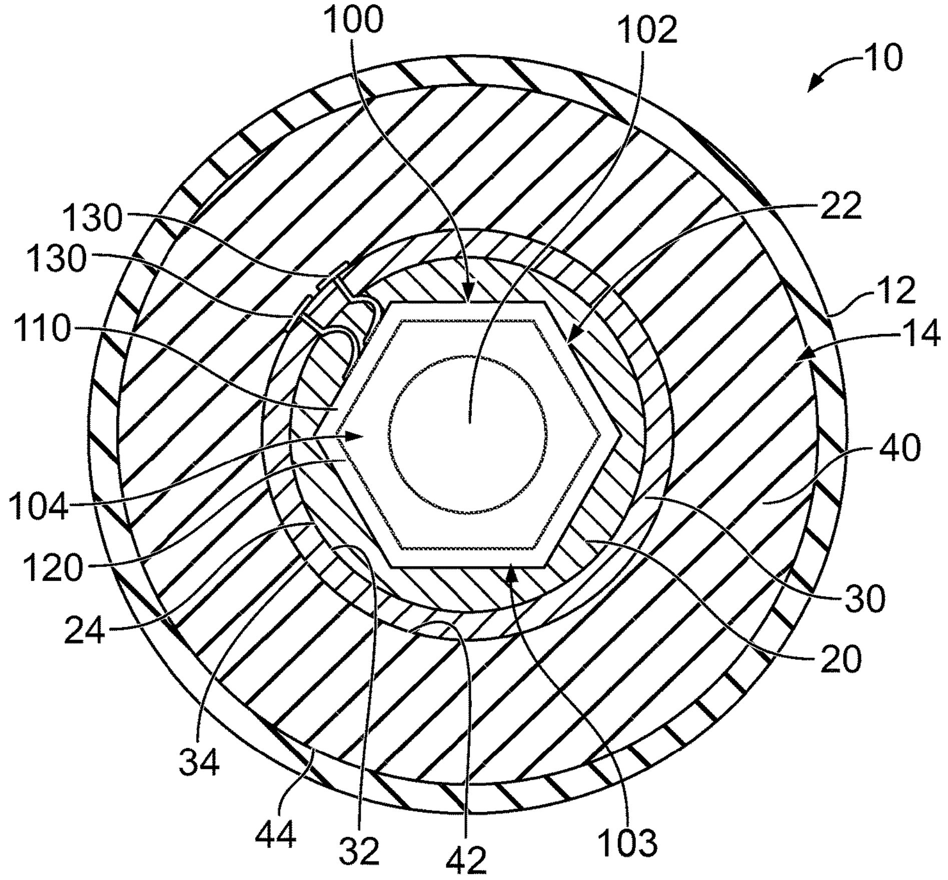
FIG. 2 is a cross-sectional view of the device including the antenna module in accordance with an exemplary embodiment.

FIG. 1 is an exploded view of a device 10 including an antenna module 100 in accordance with an exemplary embodiment. FIG. 2 is a cross-sectional view of the device 10 including the antenna module 100 in accordance with an exemplary embodiment. In an exemplary embodiment, the device 10 is a device in motion that is configured to be movable and the antenna module 100 is used for tracking the location of the device 10. The device 10 is movable in three-dimensional space. In an exemplary embodiment, the device 10 is a sports ball and the antenna module 100 is used for tracking the location of the sports ball. In the illustrated embodiment, the device 10 is a golf ball; however, the antenna module 100 may be used with other types of sports balls, such as baseballs, footballs, soccer balls, and the like. The antenna module 100 may be used with other types of sporting equipment to track location of the supporting equipment. The antenna module 100 may be used with other types of devices in motion, such as vehicles, equipment, personal items (for example, backpacks, purses, computer bags, etc.), people, pets, and the like.

The antenna module 100 is a compact wireless device configured to transmit and receive data. In an exemplary embodiment, the antenna module 100 includes multiple antennas, such as a Global Positioning System (GPS) antenna and a Bluetooth antenna, to transmit and receive data. The antenna module 100 has a very small size for use in many types of devices 10. In an exemplary embodiment, the antenna module 100 has an omnidirectional radiating pattern to allow communication with other wireless devices and/or GPS satellites. The antenna module 100 is operable in any orientation having an efficient 3D radiating pattern. The antenna module 100 is an electrically small antenna for use in a compact device. The antenna module 100 uses three-dimensional space to form a volumetric antenna within the device 10. The antenna module 100 has high isolation between different antenna elements for efficient operation. The antenna module 100 has high radiation efficiency by each antenna element.

In the illustrated embodiment, the device 10 is a golf ball; however, the antenna module 100 may be used in other types of devices in alternative embodiments. The device 10 includes an outer cover 12 and a core 14 surrounded by the outer cover 12. The antenna module 100 is contained within the core 14. In an exemplary embodiment, the device 10 is spherical; however, the device 10 may have other shapes in alternative embodiments. The core 14 may include multiple layers, which may be assembled as hemi spherical halves. Alternatively, the layers may be built up during different molding operations. In the illustrated embodiment, the core 14 includes three different layers including an inner core 20, an intermediate core 30 surrounding the inner core 20, and an outer core 40 surrounding the intermediate core 30. The device 10 may include greater or fewer layers in alternative embodiments.

The inner core 20 is manufactured from a dielectric material, such as plastic or rubber. In an exemplary embodiment, the inner core 20 is manufactured from an energy absorbing compound. The antenna module 100 is held in the inner core 20. For example, the antenna module 100 may be held in a pocket 22 in the inner core 20. In various embodiments, the pocket 22 may be preformed in the inner core 20 to receive the antenna module 100. For example, the inner core 20 may include two halves, each having corresponding pockets, which are connected together, such as using adhesive or other bonding techniques. In various embodiments, one or more antenna elements of the antenna module 100 are provided on the walls defining the pocket 22. In alternative embodiments, the inner core 20 is molded around the antenna module 100 such that the pocket 22 is formed around the antenna module 100 during molding of the inner core 20. The inner core 20 includes an outer surface 24. In the illustrated embodiment, the outer surface 24 is spherical. In various embodiments, one or more antenna elements of the antenna module 100 are provided on the outer surface 24 of the inner core 20. In alternative embodiments, one or more antenna elements of the antenna module 100 are embedded internally within the inner core 20. The inner core 20 may form a spherical substrate (for example supporting structure) for the one or more antenna elements.

The intermediate core 30 is a protective layer for the inner core 20. The intermediate core 30 may be manufactured from a dielectric material, such as plastic material. In various embodiments, the intermediate core 30 is manufactured from an impact resistant polymer material. The intermediate core 30 includes an inner surface 32 and an outer surface 34. In an exemplary embodiment, the inner surface 32 and the outer surface 34 are spherical surfaces. The intermediate core 30 may form a spherical substrate (for example supporting structure) for the one or more antenna elements. In various embodiments, one or more antenna elements of the antenna module 100 are provided on the inner surface 32. In other various embodiments, one or more antenna elements of the antenna module 100 are provided on the outer surface 34. In alternative embodiments, one or more antenna elements of the antenna module 100 are embedded internally within the intermediate core 30.

The outer core 40 surrounds the intermediate core 30. The outer core 40 may be manufactured from a dielectric material, such as a plastic material. In various embodiments, the outer core 40 is manufactured from a polybutadiene formulation. The outer core 40 includes an inner surface 42 and an outer surface 44. In an exemplary embodiment, the inner surface 42 and the outer surface 44 are spherical surfaces. The outer core 40 may form a spherical substrate (for example supporting structure) for the one or more antenna elements. In various embodiments, one or more antenna elements of the antenna module 100 are provided on the inner surface 42. In other various embodiments, one or more antenna elements of the antenna module 100 are provided on the outer surface 44. In alternative embodiments, one or more antenna elements of the antenna module 100 are embedded internally within the outer core 40.

The outer cover 12 surrounds the outer surface 44 of the outer core 40. In various embodiments, the outer cover 12 may be manufactured from a urethane material. In various embodiments, one or more antenna elements of the antenna module 100 are provided on the outer cover 12.

The antenna module 100 includes various electronic components contained within a compact package that form a volumetric antenna structure. In an exemplary embodiment, the antenna module 100 includes battery 102 for powering the antenna module 100. The antenna module 100 includes a flexible circuit 110 having electronics for operating the antenna module 100. The antenna module 100 includes a ground plane 120. The antenna module 100 includes a plurality of antenna elements 130 that form radiating structures for the antenna module 100. The various antenna elements 130 may operate at different frequencies. For example, one of the antenna elements 130 may operate at a GPS frequency, such as the 1.575 GHz GPS frequency. One of the antenna elements 130 may operate at a Bluetooth frequency, such as the 2.4 GHz Bluetooth frequency. The antenna elements 130 may be designed to operate at other frequencies in alternative embodiments. In various embodiments, the antenna elements 130 are inverted-F antennas (IFA). However, other types of antenna elements may be used in alternative embodiments.

In an exemplary embodiment, the flexible circuit 110 at least partially surrounds the battery 102. For example, the flexible circuit 110 forms a volumetric space 103 having an interior volume 104. The flexible circuit 110 is wrapped at least partially around the interior volume 104. The interior volume 104 receives the battery 102 and/or other electronic components of the antenna module 100. In various embodiments, the flexible circuit 110 may substantially enclose the interior volume 104 (for example, extend along all sides of the interior volume 104). Optionally, the size of the interior volume 104 may be dictated by the size of the battery 102. Optionally, the battery 102 may be cylindrical. The flexible circuit 110 may be formed in a cylindrical shape around the interior volume 104. In other various embodiments, the flexible circuit 110 may be formed in a polygon shape that closely surrounds the cylindrical shape of the battery 102. For example, the flexible circuit 110 may be formed in a square shape having four sides, a hexagonal shaped having six sides, and octagonal shape having eight sides, or another shape having a different number of sides.

The battery 102 may be connected to the ground plane 120. Other electronic components may be electrically connected to the ground plane 120. Optionally, the ground plane 120 may be defined by one or more layers of the flexible circuit 110. In alternative embodiments, the ground plane 120 may be a separate structure from the flexible circuit 110, which may be electrically connected to one or more circuits of the flexible circuit 110. In various embodiments, the ground plane 120 may be a stamped and formed metal plate. The flexible circuit 110 may be coupled to the ground plane 120. Optionally, the ground plane 120 may at least partially surround the battery 102. In various embodiments, the ground plane 120 may substantially enclose or surround the battery 102. The ground plane 120 is wrapped at least partially around the interior volume 104 that receives the battery 102 and/or other electronic components of the antenna module 100. The ground plane 120 may extend along at least some of the same portions of the interior volume 104 as the flexible circuit 110. The ground plane 120 may extend along different portions of the interior volume 104 from the flexible circuit 110. In various embodiments, the ground plane 120 may substantially enclose the interior volume 104 (for example, extend along all sides of the interior volume 104).

Figure 3:
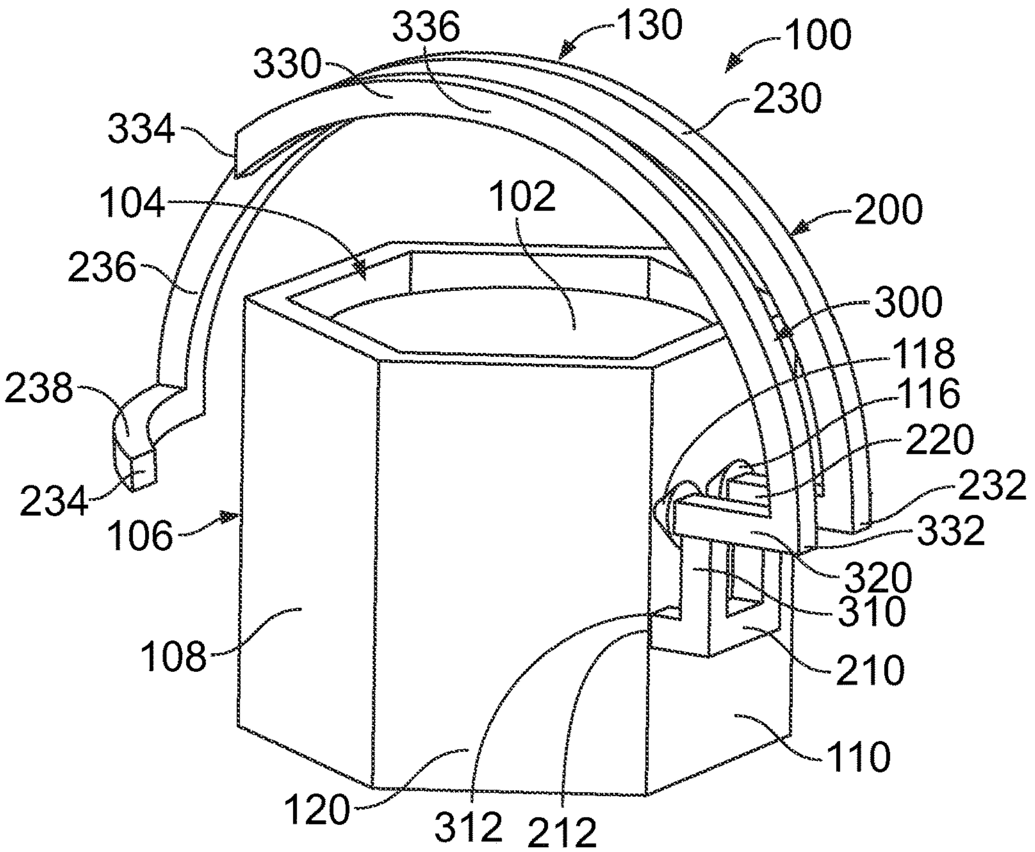
FIG. 3 is a side perspective view of the antenna module in accordance with an exemplary embodiment.
Figure 4:
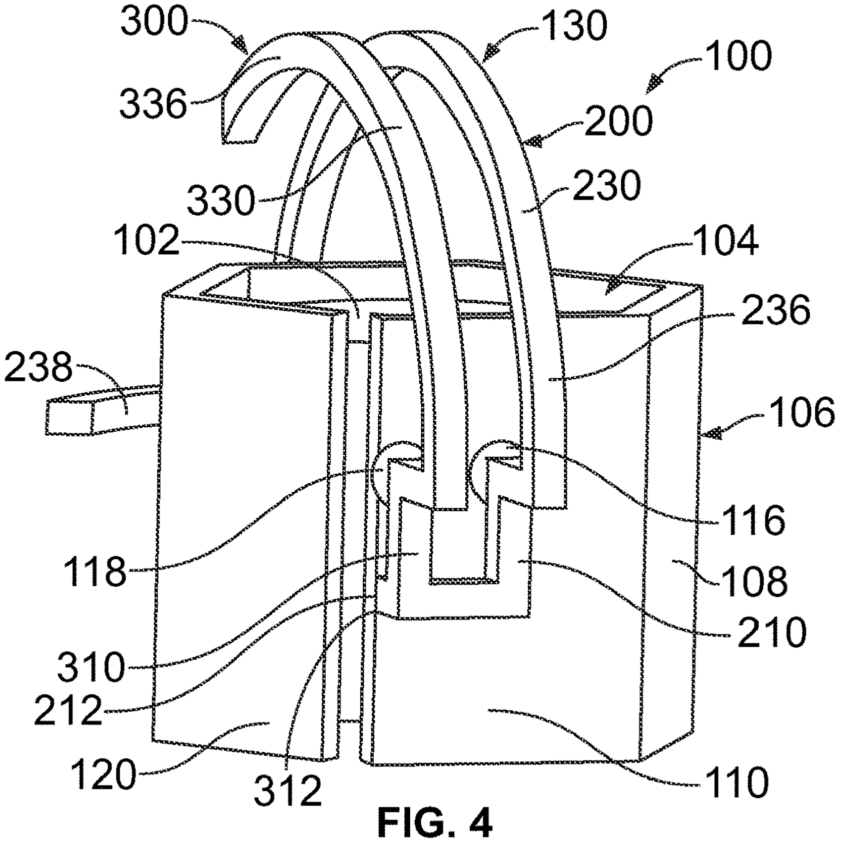
FIG. 4 is a front perspective view of the antenna module in accordance with an exemplary embodiment.
Figure 5:
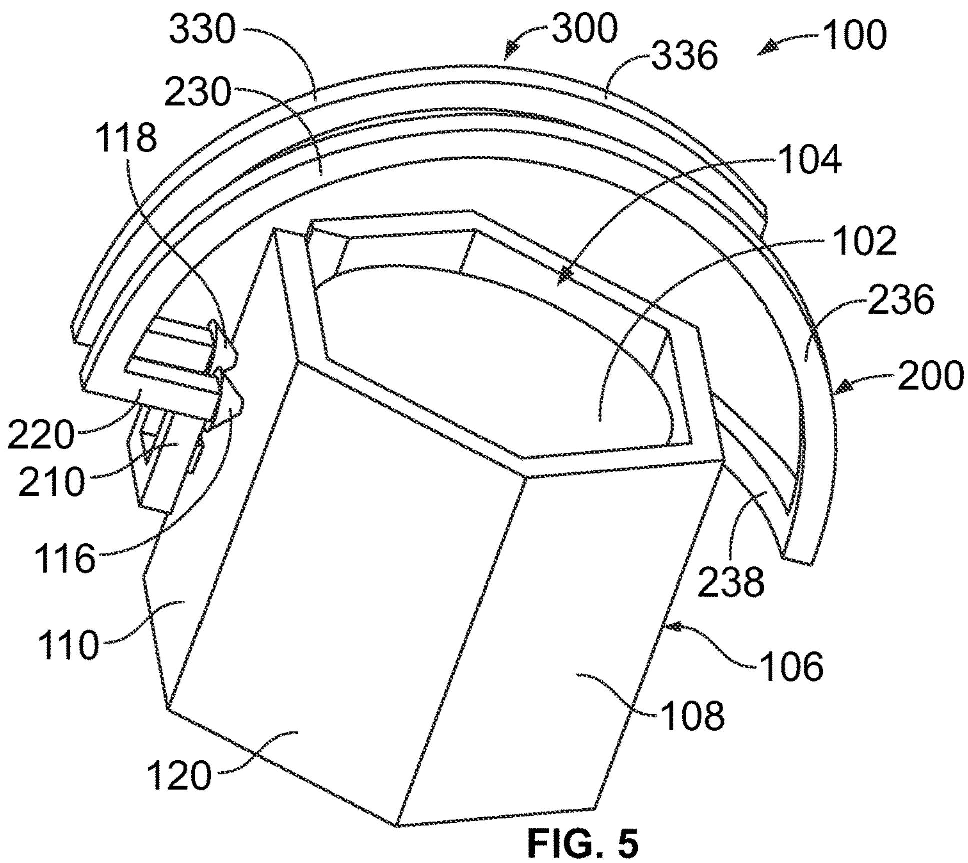
FIG. 5 is a top perspective view of the antenna module in accordance with an exemplary embodiment.

FIG. 3 is a side perspective view of the antenna module 100 in accordance with an exemplary embodiment. FIG. 4 is a front perspective view of the antenna module 100 in accordance with an exemplary embodiment. FIG. 5 is a top perspective view of the antenna module 100 in accordance with an exemplary embodiment. The antenna module 100 is shown with the flexible circuit 110 and the ground plane 120 surrounding the interior volume 104 that receives the battery 102 and with the antenna elements 130 extending from the flexible circuit 110 to form a volumetric antenna structure.

The antenna elements 130 provide 3D omnidirectional antenna coverage. In an exemplary embodiment, the antenna elements 130 extend parallel to each other. The antenna elements 130 extend along an arcuate paths. In an exemplary embodiment, the antenna elements 130 are provided on a spherical envelope surrounding the interior volume 104. For example, the antenna elements 130 may be provided on a spherical substrate radially outward of the interior volume 104, such as on one of the layers of the core 14 of the device 10. For example, the antenna elements 130 may be provided on the inner surface or the outer surface of one of the layers of the core 14. The core layer defines the spherical envelope for the antenna element 130. For example, the spherical envelope may be defined by the inner surface of the core layer or the spherical envelope may be defined by the outer surface of the core layer.

In an exemplary embodiment, the antenna elements 130 are conductive wires, which may be formed into a predetermined shape and/or may be coupled to the spherical substrate (for example, one of the layers of the core 14) to take on a particular shape that provides an efficient radiation pattern (for example, an omnidirectional radiation pattern). In various embodiments, the conductive wire is square wire. The conductive wire may be round wire or flat wire in alternative embodiments. The conductive wire may be extruded wire. The conductive wire may be braided wire for stranded wire in various embodiments. In alternative embodiments, the antenna elements 130 may be stamped and formed plates or sheets in alternative embodiments rather than conductive wires. In other alternative embodiments, the antenna elements 130 may be formed from conductive traces that are formed directly on the spherical substrate. For example, the antenna elements 130 may be printed and/or plated conductive elements formed on the spherical substrate. In other various embodiments, the antenna elements 130 may be laser direct structuring (LDS) traces formed on the spherical substrate. Other types of antenna elements may be used in alternative embodiments.

Figure 6:
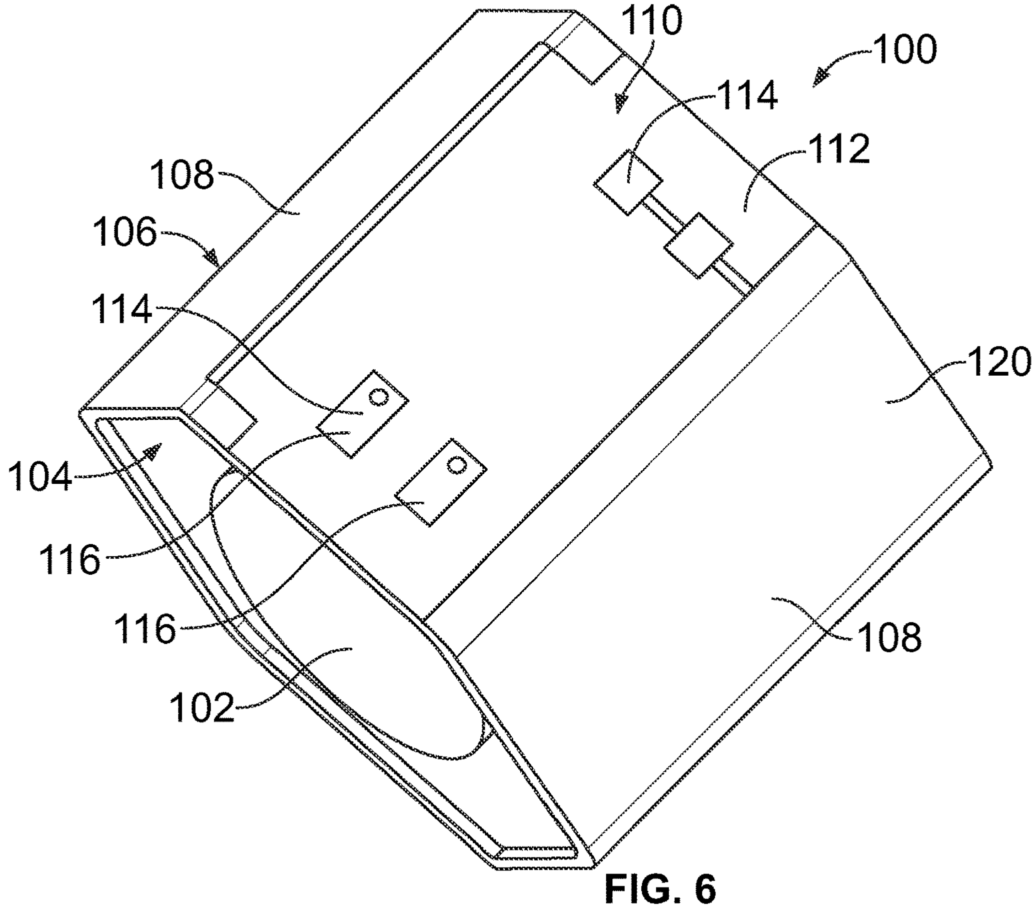
FIG. 6 is a perspective view of a portion of the antenna module showing the structure of the flexible circuit in the ground plane in accordance with an exemplary embodiment.

With additional reference to FIG. 6, which is a perspective view of a portion of the antenna module 100 showing the structure of the flexible circuit 110 in the ground plane 120 in accordance with an exemplary embodiment, the flexible circuit 110 and the ground plane 120 form a volumetric antenna structure 106. The antenna elements 130 (FIGS. 3-5) extend from the antenna structure 106 and surround a portion of the antenna structure 106. The antenna structure 106 extends around the entire perimeter of the interior volume 104 in the illustrated embodiment (for example, around all sides of the interior volume 104). In the illustrated embodiment, the antenna structure 106 is hexagonal having six panels 108. Each of the panels 108 may be approximately equal sized. The antenna structure 106 may be open at a top and/or a bottom of the antenna structure, such as to receive the battery 102.

The flexible circuit 110 includes a substrate 112 and circuit conductors 114 formed on the substrate 112. The circuit conductors 114 may be traces, pads, vias, and the like. Other electronic components may be mounted to the substrate 112 to operate the antenna module 100, such as a transmitter, a receiver, a processor, or other types of electronic components.

In an exemplary embodiment, the flexible circuit 110 includes a first antenna feed 116 and a second antenna feed 118. The first antenna feed 116 is connected to a first antenna element 200 of the antenna elements 130. The second antenna feed 118 is connected to a second antenna element 300 of the antenna elements 130. The flexible circuit 110 may include greater or fewer antenna feeds in alternative embodiments to support other antenna elements 130. The antenna feeds 116, 118 may be different circuits on the flexible circuit 110. In various embodiments, contacts or wires may be connected to the antenna feeds 116, 118, such as to connect to the antenna elements 130.

The first antenna element 200 includes a ground short stub 210, a connecting element 220, and a radiating element 230. The ground short stub 210 is electrically connected to the ground plane 120. For example, the ground short stub 210 extends from the connecting element 220 to a ground connection point 212. The ground connection point 212 may be at the flexible circuit 110, such as to a ground trace or ground contact or ground plane of the flexible circuit 110. Alternatively, the ground connection point 212 may be directly at the ground plane 120, such as a solder point to the stamped and formed metal plate defining the ground plane 120. The ground short stub 210 has a length that is significantly shorter than the radiating element 230. In the illustrated embodiment, the ground short stub 210 includes multiple legs or segments between the connecting element 220 and the ground connection point 212. For example, the ground short stub 210 may be L-shaped. However, in alternative embodiments, the ground short stub 210 may have other shapes. Optionally, the ground short stub 210 may include a single leg or segment between the connecting element 220 and the ground connection point 212.

The connecting element 220 extends outward away from the flexible circuit 110. The connecting element 220 extends away from the interior volume 104 to position the radiating element 230 at a location outward away from the interior volume 104. The connecting element 220 spans the distance between the antenna feed 116 and the radiating element 230. For example, the connecting element 220 may pass through one or more layers of the core 14 to the layer of the core supporting the radiating element 230.

The radiating element 230 extends along an arcuate path. In an exemplary embodiment, the radiating element 230 is provided on a spherical envelope surrounding the interior volume 104. For example, the radiating element 230 may be provided on a spherical substrate radially outward of the interior volume 104, such as on one of the layers of the inner core 14 of the device 10. For example, the radiating element 230 may be provided on the inner surface or the outer surface of one of the layers of the inner core 14.

The radiating element 230 extends between a first end 232 and a second end 234. The radiating element 230 has a radiating length between the first end 232 and the second end 234. The radiating length may be approximately one quarter wavelength of the target operating frequency for the antenna element 200. For example, the antenna element 200 may be a GPS antenna element configured to be operable at a 1.57 GHz GPS frequency. The radiating length may be selected for efficient operation at such frequency. In an exemplary embodiment, the radiating element 230 includes a main segment 236 and an extension segment 238 extending from the main segment 236. The main segment 236 extends between the first end 232 and the extension segment 238. The extension segment 238 extends between the main segment 236 and the second end 234. The radiating element 230 may include greater or fewer segments in alternative embodiments to increase or decrease the radiating length of the radiating element 230.

The main segment 236 extends along a first arcuate path. For example, the main segment 236 extends a first arc length along a first circle. Optionally, the first circle may be an orthodrome or great circle of the spherical substrate (for example, largest circle that can be drawn on the spherical substrate). Alternatively, the first circle may be a small circle of the spherical substrate (for example, intersection of the sphere with a plane not passing through its center). In an exemplary embodiment, the first arcuate path of the main segment 236 is approximately equal to half of a circumferential path of the first circle. For example, the main segment 236 may extend approximately 180° along the spherical substrate. The radiating element 230 may be contained within a hemi-spherical portion of the spherical substrate for ease of manufacture. For example, when the core layer of the device is assembled using two hemispherical halves, the radiating element 230 may be contained in one of the halves to reduce cost of manufacture of the antenna structure.

The extension segment 238 increases the overall radiating length of the radiating element 230 beyond the first arc length of the main segment 236. The extension segment 238 extends along a different arcuate path from the main segment 236. The extension segment 238 may extend from the main segment 236 in a direction transverse to the first arcuate path. In various embodiments, the extension segment 238 may extend along an arcuate path that is oriented perpendicular to the first arcuate path of the main segment 236 (for example, longitude versus lateral or equator versus meridian). However, the extension segment 238 may extend from the main segment 236 at other non-perpendicular angles in alternative embodiments.

The segments 236, 238 may extend along other, non-circular paths in alternative embodiments. For example, the segments 236, 238 may extend along helical paths in various embodiments. The segments 236, 230 may extend along linear or angular paths in alternative embodiments.

The second antenna element 300 is located in close proximity to the first antenna element 200. In an exemplary embodiment, the second antenna element 300 is spaced apart from the first antenna element 200 to provide sufficient the coupling for proper operation of both antenna elements 200, 300. For example, the first and second antenna elements 200, 300 may have a transmission coefficient lower than −10 dB to maintain high radiation efficiency and the directionality of both antenna elements 200, 300. In an exemplary embodiment, the first and second antenna elements 200, 300 extend parallel to each other but are spaced apart by a spacing 302 sufficient to achieve the desired the coupling. In the illustrated embodiment, the spacing 302 is approximately 2 mm. However the spacing may be wider or narrower in alternative embodiments. In an exemplary embodiment, the spacing is less than 2% of a quarter wavelength of the first antenna element 200 and/or the second antenna element 300.

The second antenna element 300 includes a ground short stub 310, a connecting element 320, and a radiating element 330. The ground short stub 310 is electrically connected to the ground plane 120. For example, the ground short stub

310 extends from the connecting element 320 to a ground connection point 312. In an exemplary embodiment, the ground connection point 312 is coincident with the ground connection point 212. For example, a single ground connection point is used for both the ground connection point 212 and the ground connection point 312 to reduce components and/or assembly time and/or cost of manufacture. The ground connection point 312 may be at the flexible circuit 110, such as to a ground trace or ground contact or ground plane of the flexible circuit 110. Alternatively, the ground connection point 312 may be directly at the ground plane 120, such as a solder point to the stamped and formed metal plate defining the ground plane 120. The ground short stub 310 has a length that is significantly shorter than the radiating element 330. In the illustrated embodiment, the ground short stub 310 includes a single leg or segment between the connecting element 320 and the ground connection point 312. However, in alternative embodiments, the ground short stub 310 may have other shapes. Optionally, the ground short stub 310 may include multiple legs or segments between the connecting element 320 and the ground connection point 312.

The connecting element 320 extends outward away from the flexible circuit 110. The connecting element 320 extends away from the interior volume 104 to position the radiating element 330 at a location outward away from the interior volume 104. The connecting element 320 spans the distance between the antenna feed 116 and the radiating element 330. For example, the connecting element 320 may pass through one or more layers of the core 14 to the layer of the core supporting the radiating element 330.

The radiating element 330 extends along an arcuate path. In an exemplary embodiment, the radiating element 330 is provided on a spherical envelope surrounding the interior volume 104. For example, the radiating element 330 may be provided on a spherical substrate radially outward of the interior volume 104, such as on one of the layers of the inner core 14 of the device 10. For example, the radiating element 330 may be provided on the inner surface or the outer surface of one of the layers of the inner core 14.

The radiating element 330 extends between a first end 332 and a second end 334. The radiating element 330 has a radiating length between the first end 332 and the second end 334. The radiating length may be approximately one quarter wavelength of the target operating frequency for the antenna element 300. For example, the antenna element 300 may be a Bluetooth antenna element configured to be operable at a 2.4 GHz frequency. The radiating length may be selected for efficient operation at such frequency. In an exemplary embodiment, the radiating element 330 includes a main segment 336. The radiating element 330 may include an extension segment (not shown but similar to the extension segment 238) extending from the main segment 336.

The main segment 336 extends along a second arcuate path. For example, the main segment 336 extends a second arc length along a second circle. Optionally, the second circle may be an orthodrome or great circle of the spherical substrate (for example, largest circle that can be drawn on the spherical substrate). Alternatively, the second circle may be a small circle of the spherical substrate (for example, intersection of the sphere with a plane not passing through its center). Optionally, the second circle may have the same diameter as the first circle. Alternatively, the second circle may have a smaller diameter than the first circle. In other alternative embodiments, the second circle may have a larger diameter than the first circle. In an exemplary embodiment, the second arcuate path of the main segment 336 is shorter than the first arcuate path of the main segment 236 of the first radiating element 230. In the illustrated embodiment, the main segment 336 may extend approximately 110° along the spherical substrate. However, the main segment 336 may extend a longer or shorter distance in alternative embodiments. In an exemplary embodiment, the radiating element 330 is contained within a hemi-spherical portion of the spherical substrate for ease of manufacture. Optionally, the radiating element 330 may be contained within the same hemispherical portion of the spherical substrate as the radiating element 230 to reduce cost of manufacture of the antenna structure. The main segment 336 may extend along other, non-circular paths in alternative embodiments. For example, the main segment 336 may extend along a helical path or along linear or angular paths in alternative embodiments.

Figure 7:
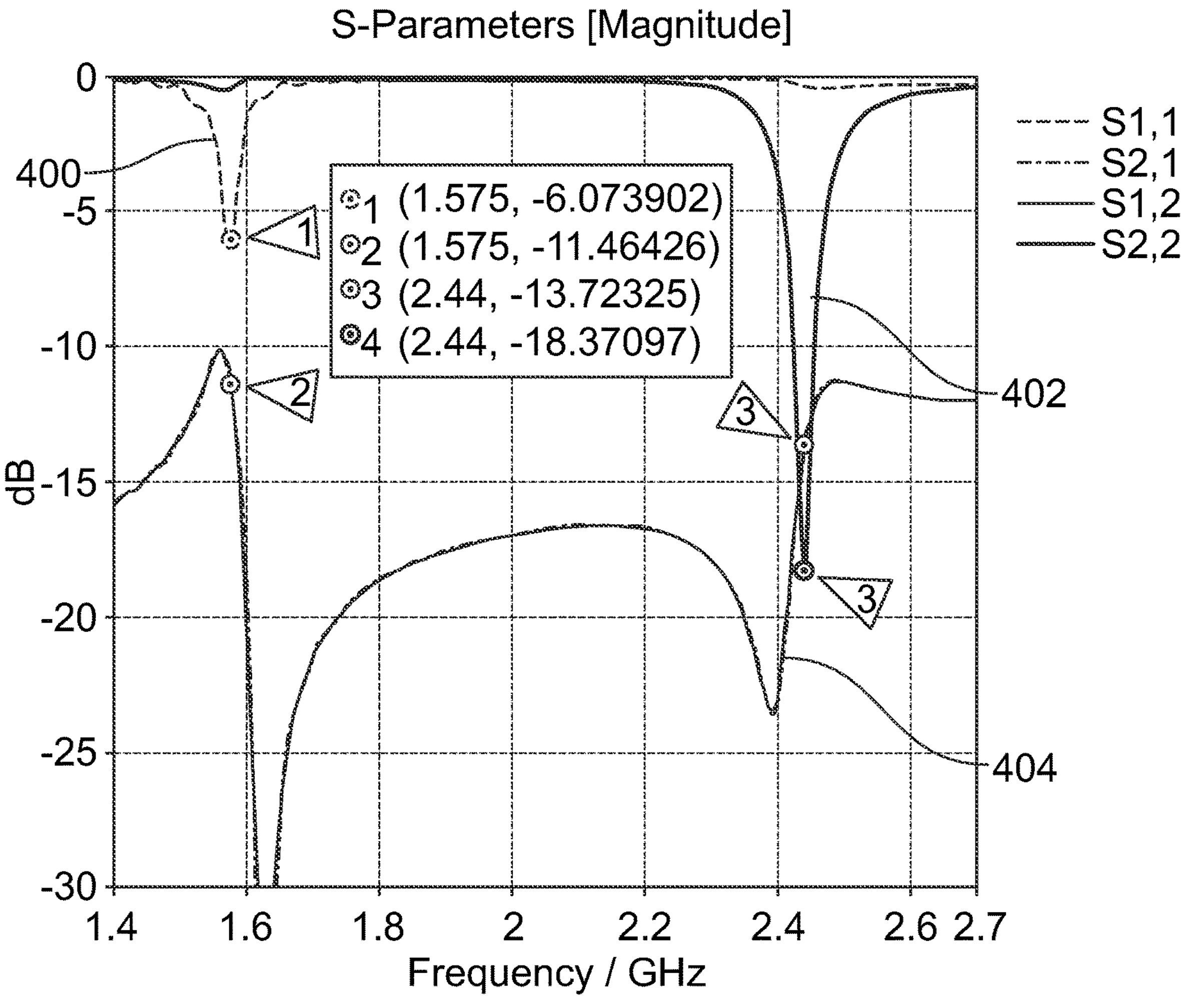
FIG. 7 shows scattering parameters (S-parameters) for the antenna module in accordance with an exemplary embodiment.

FIG. 7 shows scattering parameters (S-parameters) for the antenna module 100 in accordance with an exemplary embodiment. Lines 400, 402 show the reflection coefficient or return loss for the antenna elements 200, 300, respectively. The peak for the first antenna element 200 is at a frequency of approximately 1.575 GHz. The peak for the second antenna element 300 is at a frequency of approximately 2.48 GHz. Line 404 shows the transmission coefficient for the antenna elements 200, 300. The antenna elements 200, 300 are sufficiently decoupled having an isolation less than −10 dB.

Figure 8:
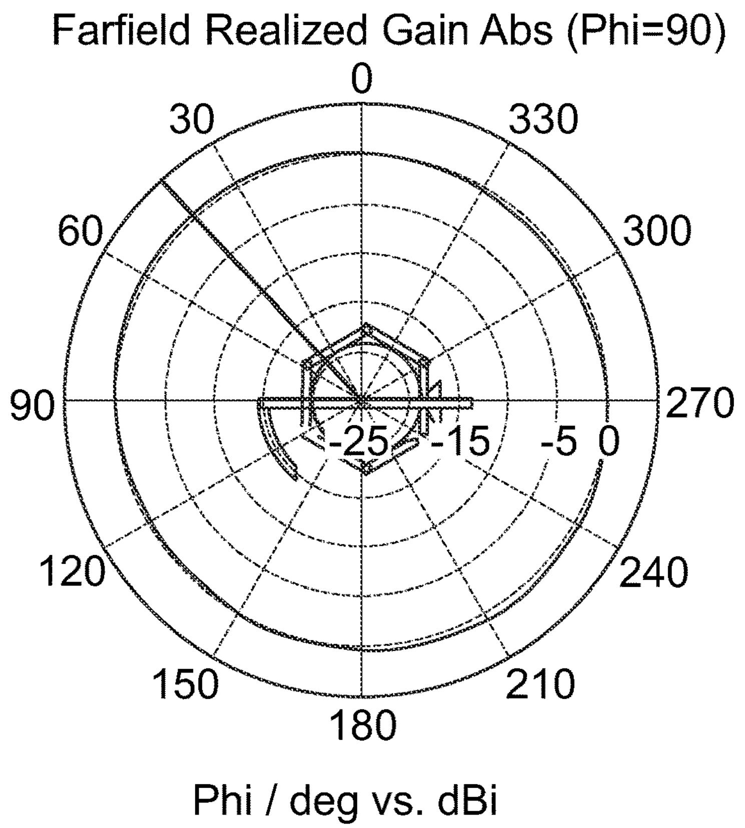
FIG. 8 shows radiation patterns for the first antenna element at the 1.575 GHz GPS frequency in accordance with an exemplary embodiment.
Figure 9:
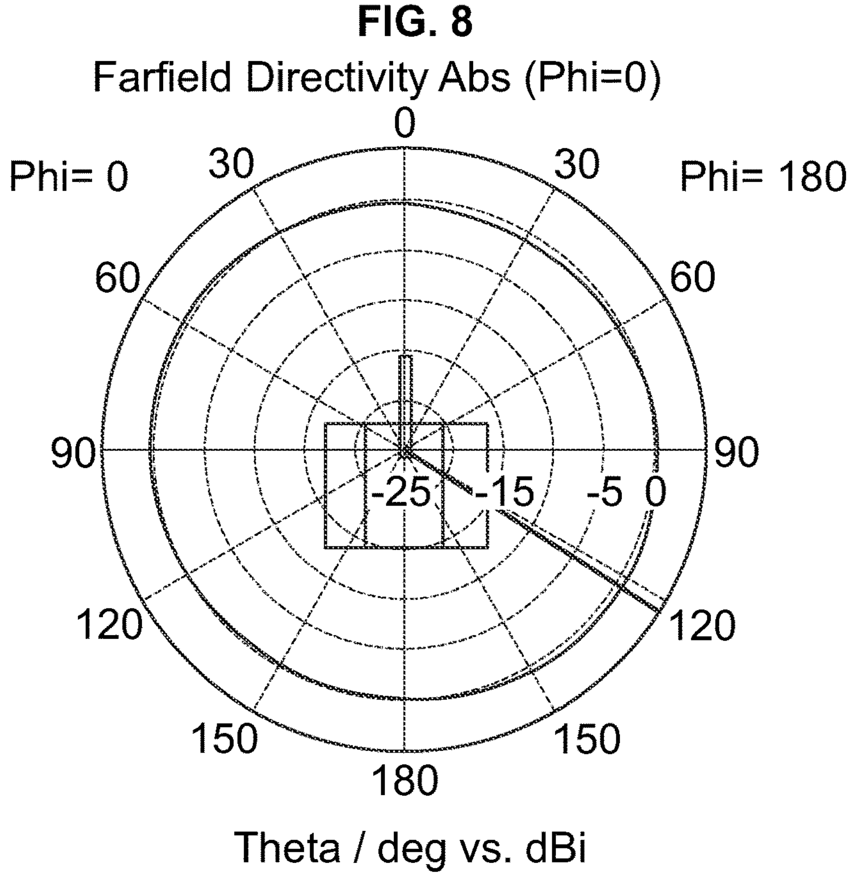
FIG. 9 shows radiation patterns for the first antenna element at the 1.575 GHz GPS frequency in accordance with an exemplary embodiment.
Figure 10:
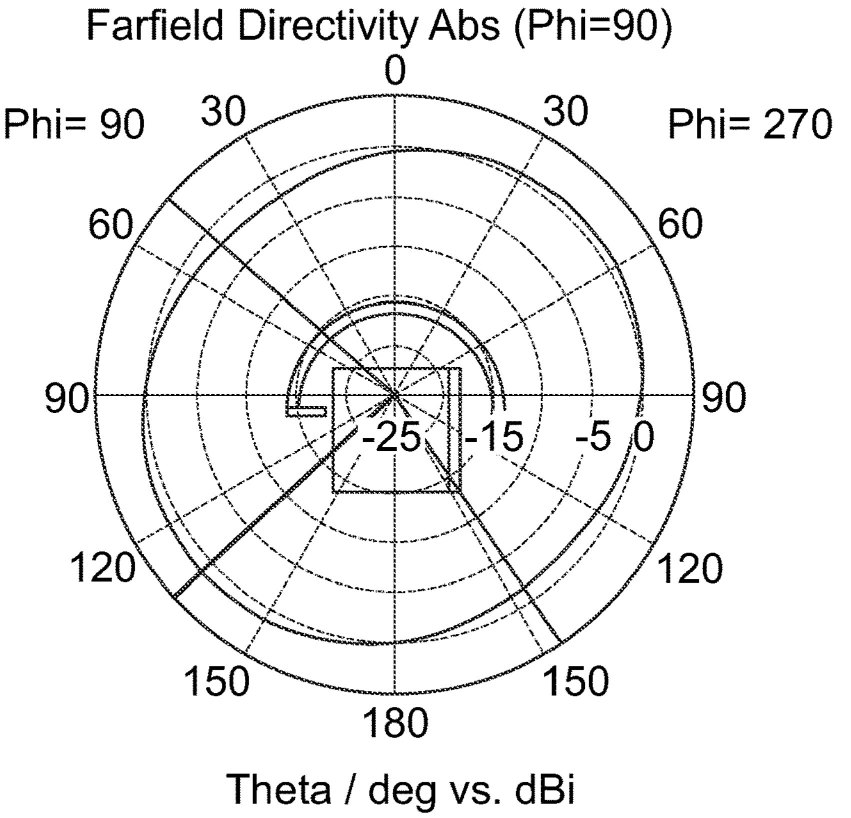
FIG. 10 shows radiation patterns for the first antenna element at the 1.575 GHz GPS frequency in accordance with an exemplary embodiment.

FIGS. 8-10 show radiation patterns for the first antenna element 200 at the 1.575 GHz GPS frequency. The analysis results shown in FIGS. 8-10 are provided for purposes of illustration and not for purposes of limitation. Alternative embodiments of the antenna element may be configured differently and have different operational or performance parameters than what is shown in FIGS. 8-10.

Figure 11:
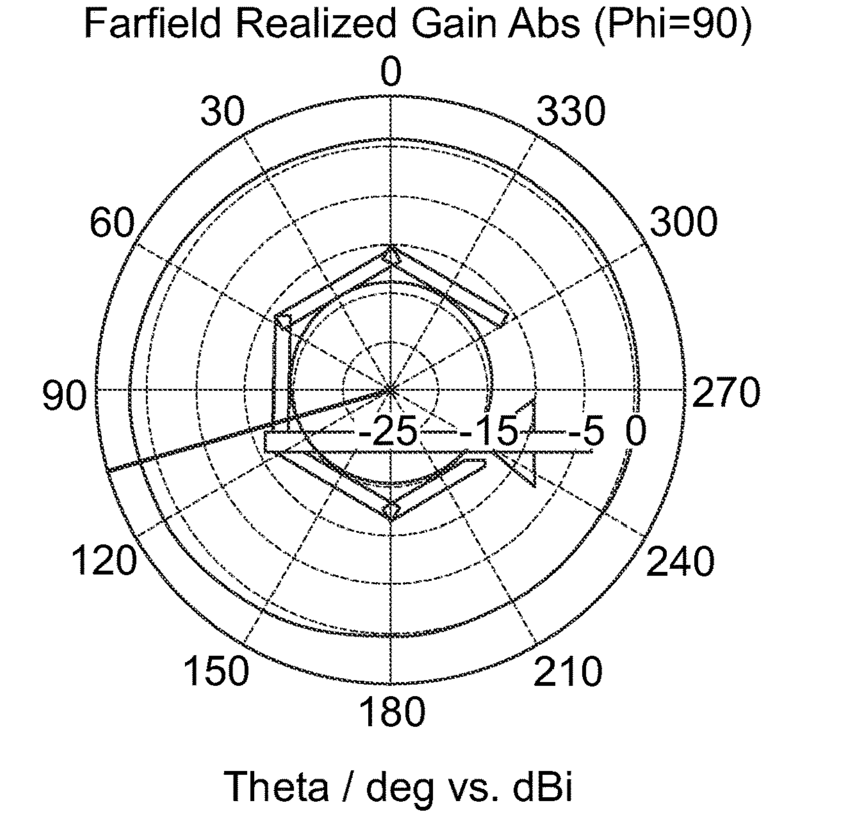
FIG. 11 shows radiation patterns for the first antenna element at the 1.575 GHz GPS frequency in accordance with an exemplary embodiment.
Figure 12:
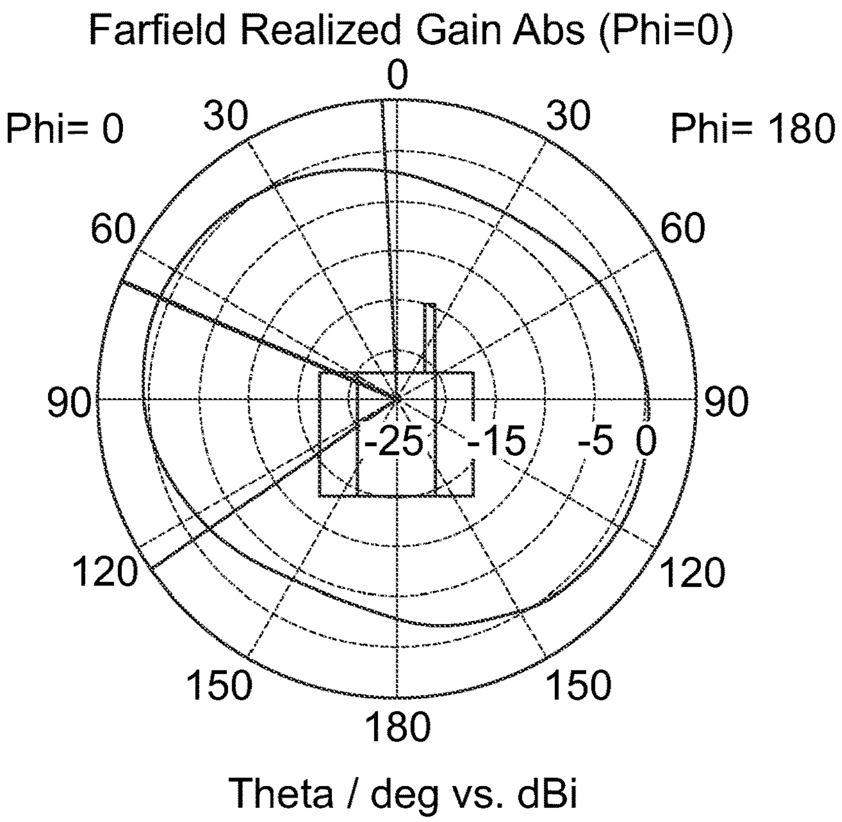
FIG. 12 shows radiation patterns for the first antenna element at the 1.575 GHz GPS frequency in accordance with an exemplary embodiment.
Figure 13:
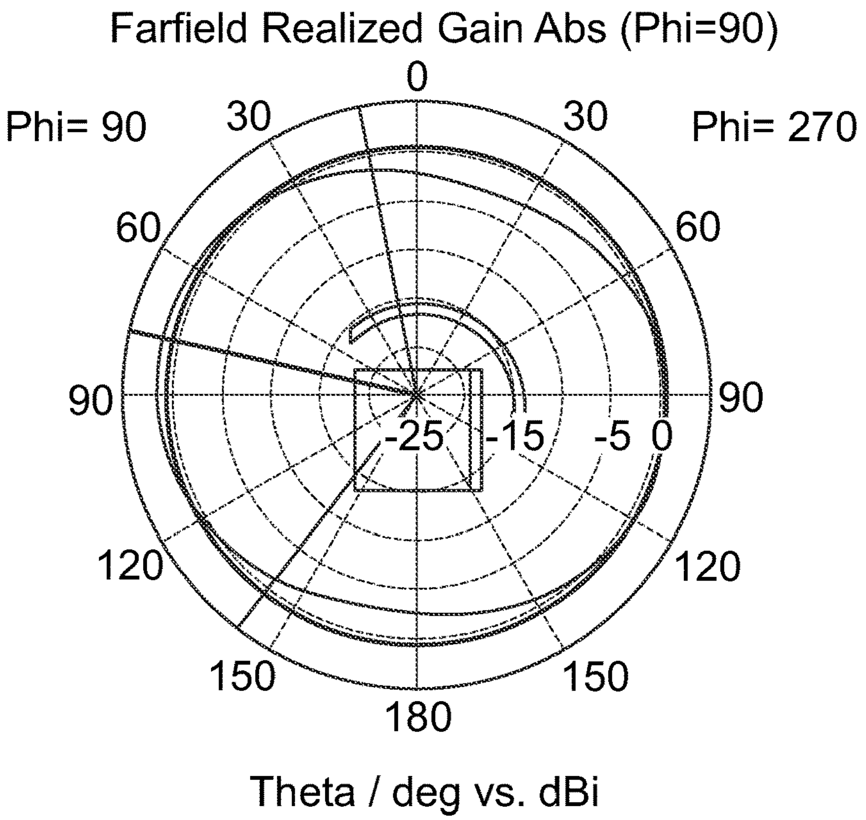
FIG. 13 shows radiation patterns for the first antenna element at the 1.575 GHz GPS frequency in accordance with an exemplary embodiment.

FIGS. 11-13 show radiation patterns for the first antenna element 200 at the 1.575 GHz GPS frequency. The analysis results shown in FIGS. 11-13 are provided for purposes of illustration and not for purposes of limitation. Alternative embodiments of the antenna element may be configured differently and have different operational or performance parameters than what is shown in FIGS. 11-13.

Figure 14:
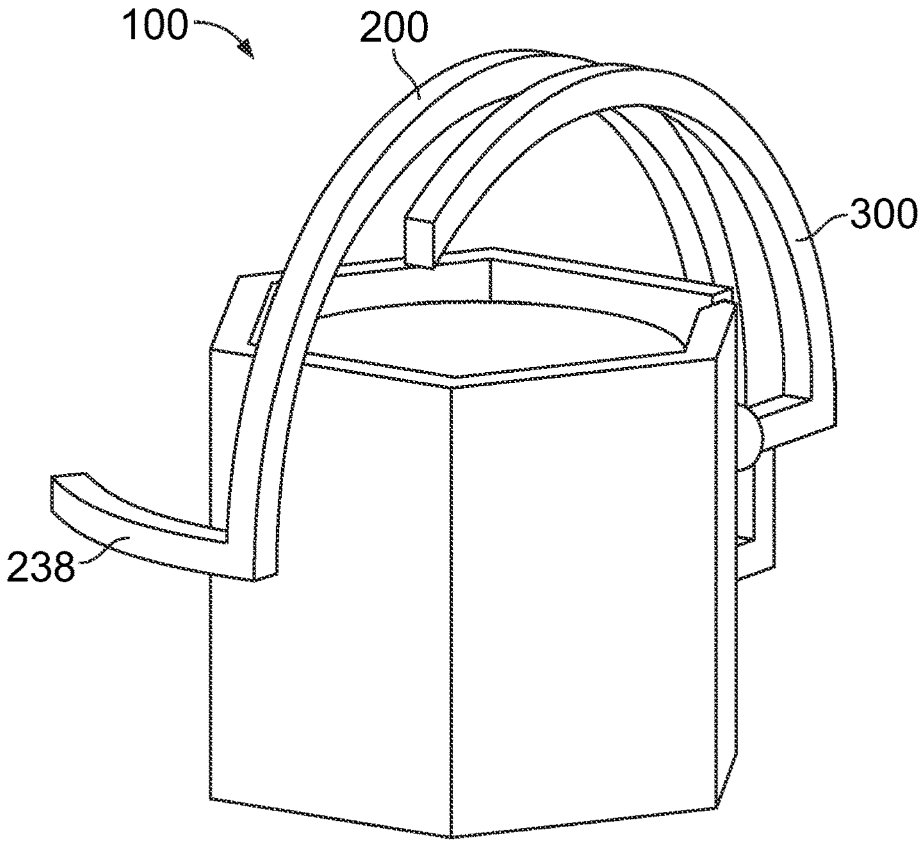
FIG. 14 is a perspective view of the antenna module in accordance with an exemplary embodiment.

FIG. 14 is a perspective view of the antenna module 100 in accordance with an exemplary embodiment. The antenna module 100 is similar to the antenna module shown in FIG. 3. However, the antenna module 100 shown in FIG. 14 has the extension segment 238 extending outward away from the second radiating element 300 rather than turned inward toward the radiating element 300. Having the extension segment 238 extending away from the second radiating element 300 may lower the transmission coefficient and provide further decoupling of the antenna elements 200, 300.

Figure 15:
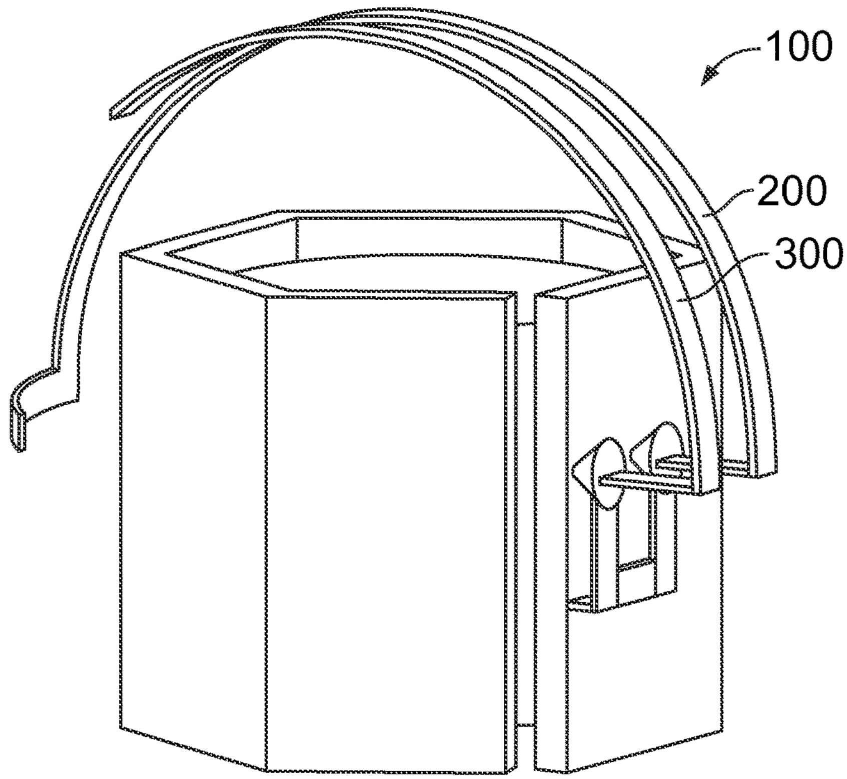
FIG. 15 is a perspective view of the antenna module in accordance with an exemplary embodiment.

FIG. 15 is a perspective view of the antenna module 100 in accordance with an exemplary embodiment. The antenna module 100 is similar to the antenna module shown in FIG. 3. However, the antenna module 100 shown in FIG. 15 includes stamped and formed plates or thin sheets for the antenna elements 200, 300 rather than the square conductive wires shown in FIG. 3.

Figure 16:
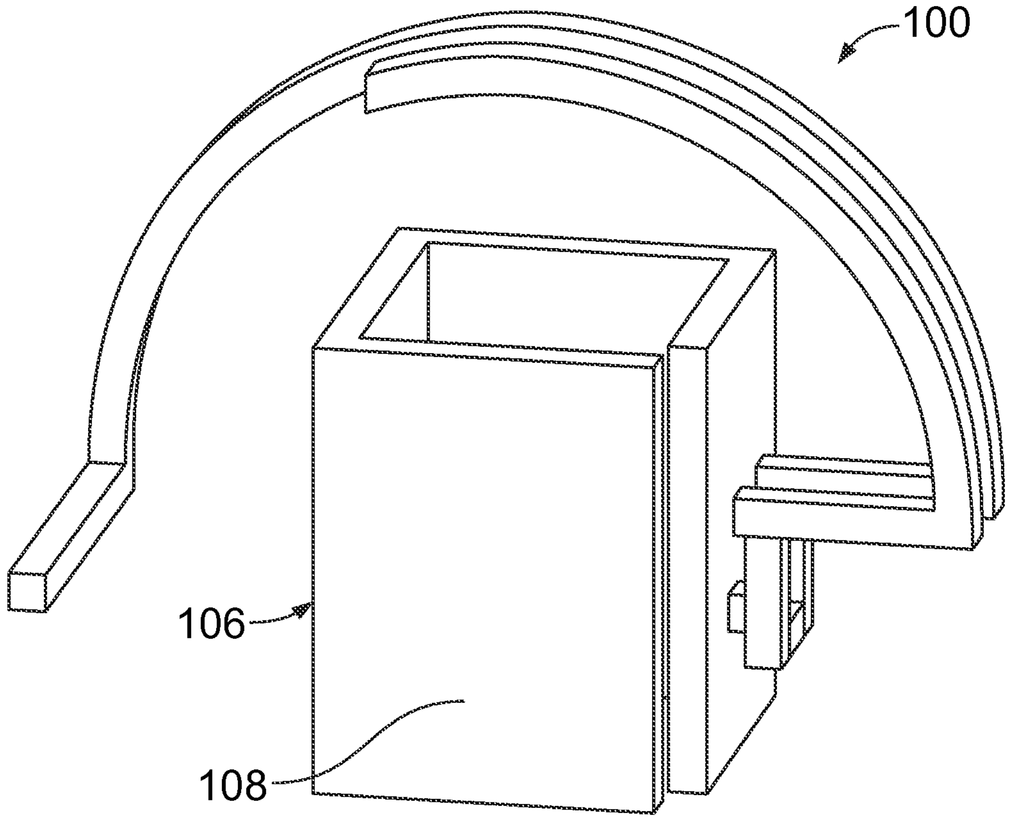
FIG. 16 is a perspective view of the antenna module in accordance with an exemplary embodiment.

FIG. 16 is a perspective view of the antenna module 100 in accordance with an exemplary embodiment. The antenna module 100 is similar to the antenna module shown in FIG. 3. However, the antenna structure 106 of the antenna module 100 shown in FIG. 16 is square rather than hexagonal. The antenna structure 106 includes four panels 108 rather than six panels.

Figure 17:
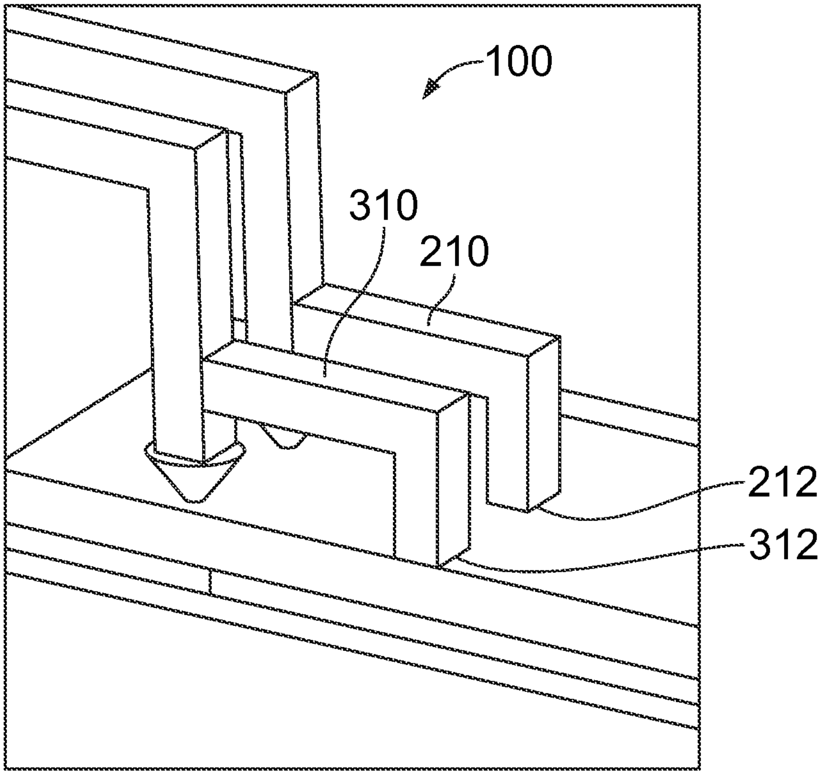
FIG. 17 is a perspective view of a portion of the antenna module in accordance with an exemplary embodiment.

FIG. 17 is a perspective view of a portion of the antenna module 100 in accordance with an exemplary embodiment. The antenna module 100 is similar to the antenna module shown in FIG. 3. However, the ground connection point 212 of the ground short stub 210 is located at a different point along the ground plane 120 than the ground connection point 312 of the ground short stub 310. The ground short stubs 210, 310 do not share the same ground connection point. Optionally, the ground short stubs 210, 310 may be identical to each other, such as extending parallel to each other and having similar shapes and lengths.

Figure 18:
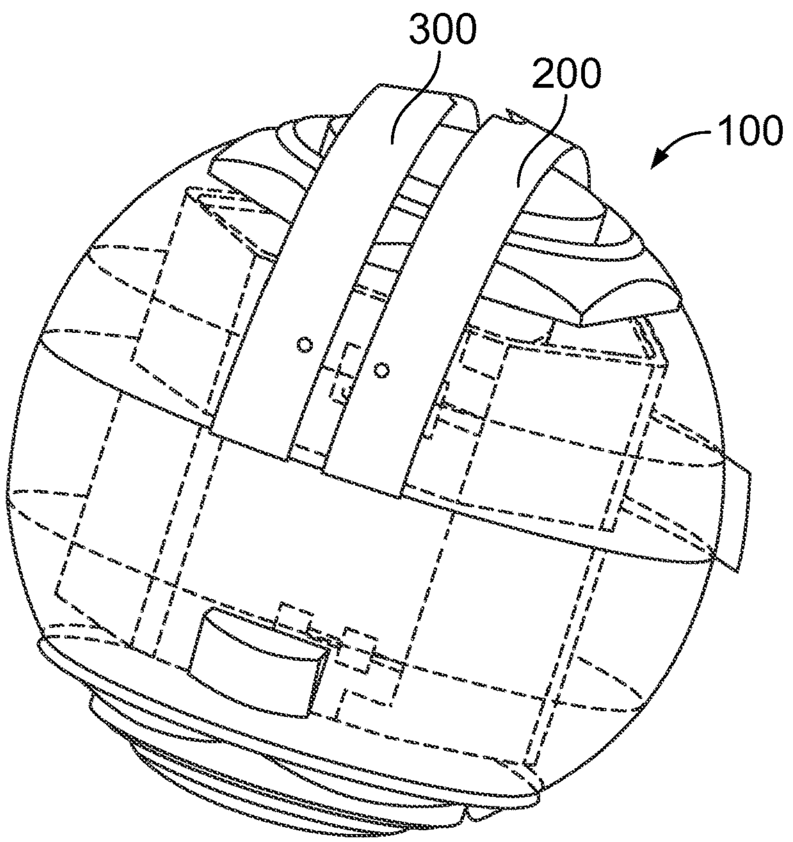
FIG. 18 is a perspective view of the antenna module in accordance with an exemplary embodiment.

FIG. 18 is a perspective view of the antenna module 100 in accordance with an exemplary embodiment. The antenna module 100 is similar to the antenna module shown in FIG. 3. However, the antenna module 100 shown in FIG. 18 includes LDS traces for the antenna elements 200, 300 rather than the square conductive wires shown in FIG. 3. In the illustrated embodiment, the antenna elements 200, 300 are formed directly on an outer surface of the spherical substrate, such as being laser direct structured on the outer surface.

Figure 19:
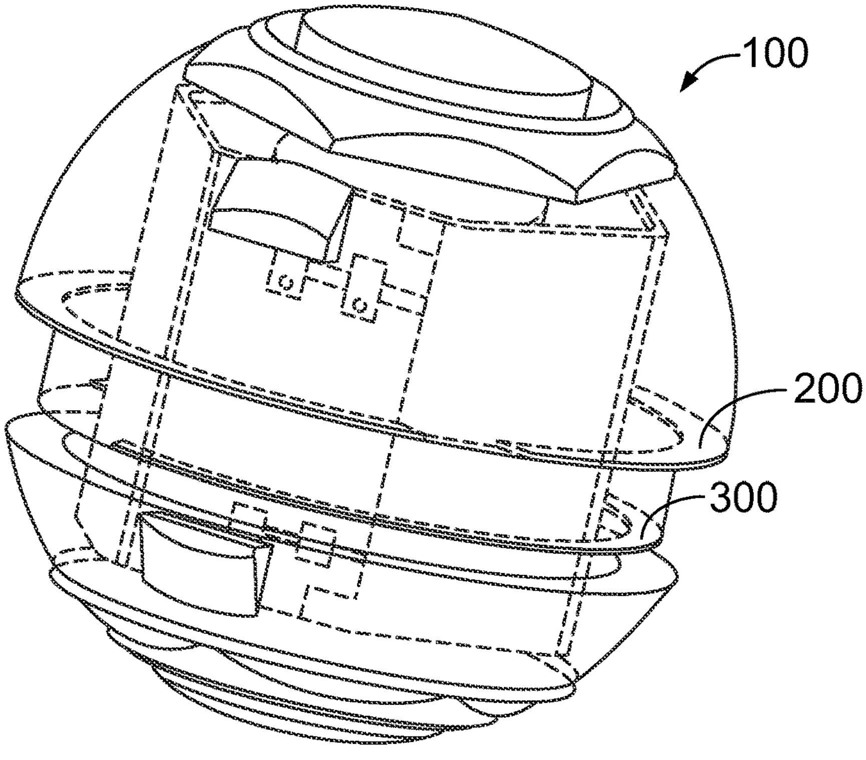
FIG. 19 is a perspective view of the antenna module in accordance with an exemplary embodiment.

FIG. 19 is a perspective view of the antenna module 100 in accordance with an exemplary embodiment. The antenna module 100 is similar to the antenna module shown in FIG. 3. However, the antenna module 100 shown in FIG. 19 includes stamped and formed plates or thin sheets for the antenna elements 200, 300 rather than the square conductive wires shown in FIG. 3. In the illustrated embodiment, the stamped and formed plates are embedded in the spherical substrate rather than being provided on the inner surface or the outer surface. For example, the spherical substrate may be molded around (for example, overmolded) the stamped and formed plates. In the illustrated embodiment, the antenna elements 200, 300 are provided in the lower half of the spherical substrate rather than the upper half.

Figure 20:
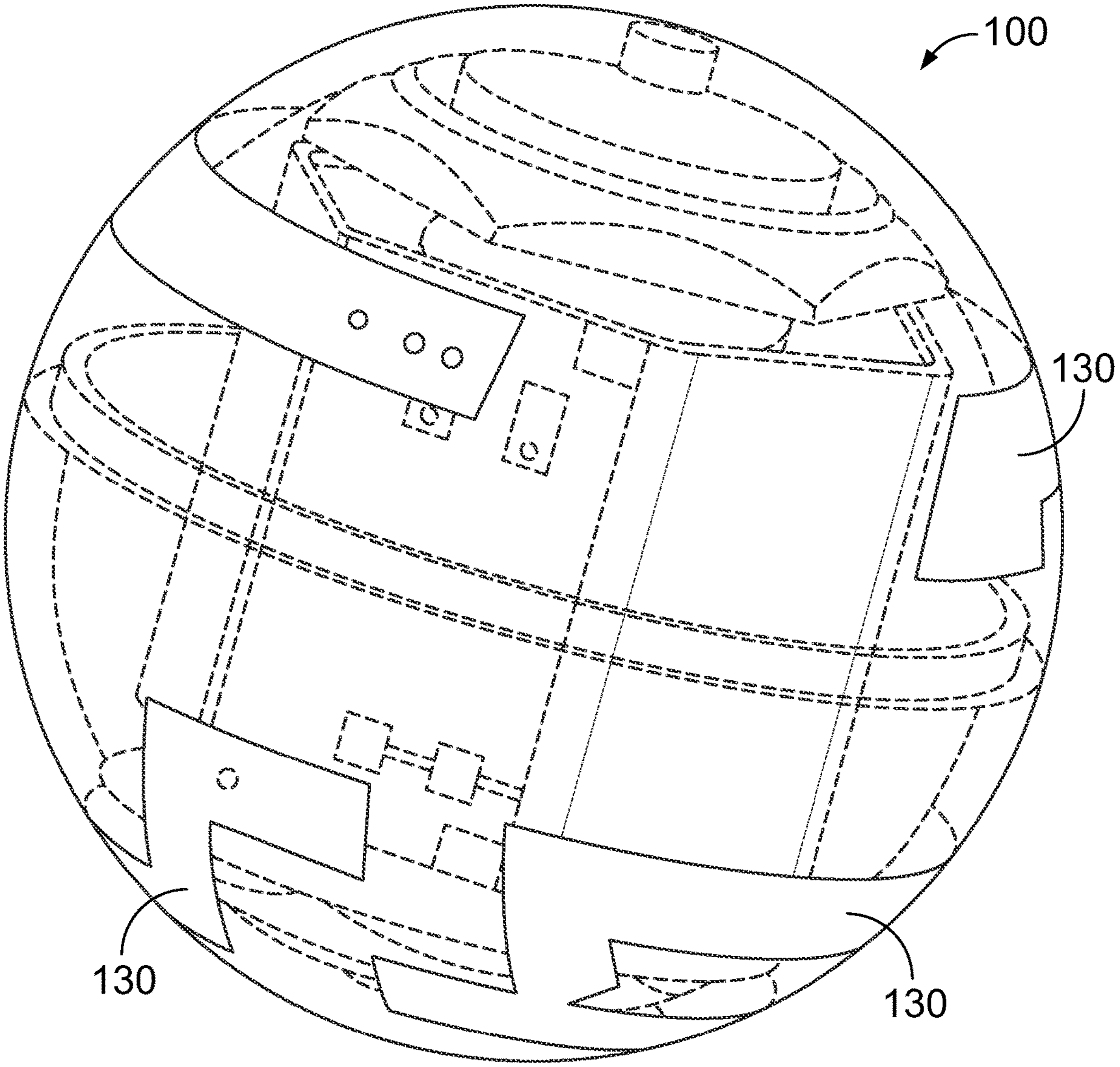
FIG. 20 is a perspective view of the antenna module in accordance with an exemplary embodiment.

FIG. 20 is a perspective view of the antenna module 100 in accordance with an exemplary embodiment. The antenna module 100 is similar to the antenna module shown in FIG. 18. However, the antenna module 100 shown in FIG. 20 includes the LDS traces provided on both the upper half and the lower half of the spherical substrate. In an exemplary embodiment, the antenna module 100 includes greater than two antenna elements 130. For example, in the illustrated embodiment, the antenna module 100 includes three of the antenna elements 130.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. An antenna module comprising:

a flexible circuit having a first antenna feed and a second antenna feed;

a ground plane;

a first antenna element coupled to the first antenna feed, the first antenna element including a first ground short stub coupled to the ground plane, the first antenna element including a first radiating element defining an omnidirectional radiation pattern, the first radiating element including a first main segment extending along a first arcuate path;

a second antenna element coupled to the second antenna feed, the second antenna element including a second ground short stub coupled to the ground plane, the second antenna element including a second radiating element defining an omnidirectional radiation pattern, the second radiating element including a second main segment extending along a second arcuate path oriented parallel to the first arcuate path;

wherein the first and second radiating elements are provided on a spherical envelope surrounding the flexible circuit and the ground plane; and wherein the first and second antenna elements have a transmission coefficient lower than −10 dB.

2. The antenna module of claim 1, wherein the first main segment and the second main segment have different lengths.

3. The antenna module of claim 1, wherein the first main segment and the second main segment are separated by a spacing, the spacing being less than 2% of a quarter wavelength of the first antenna element.

4. The antenna module of claim 1, wherein the first arcuate path extends a first arc length of a first circle.

5. The antenna module of claim 4, wherein the second arcuate path extends a second arc length of a second circle having a smaller diameter than the first circle.

6. The antenna module of claim 1, wherein the first and second radiating elements are contained within a hemispherical portion of the spherical envelope.

7. The antenna module of claim 1, wherein the first radiating element is configured to be operable at or over a 1.57 GHz GPS frequency and the second radiating element is configured to be operable at or over a 2.4 GHz Bluetooth frequency.

8. The antenna module of claim 1, wherein the first antenna element is a first inverted F antenna element and wherein the second antenna element is a second inverted-F antenna element.

9. The antenna module of claim 1, wherein the first ground short stub and the second ground short stub share a ground connection point to the ground plane.

10. The antenna module of claim 1, wherein the first antenna element is one of a wire element, a stamped and formed elements, or a Laser Direct Structuring (LDS) element.

11. The antenna module of claim 1, wherein the first radiating element includes a first extension segment extending from the first main segment in a direction transverse to the first arcuate path, the first extension segment extending along a third arcuate path.

12. An antenna module comprising:

a spherical substrate having an outer surface and an inner surface defining a central cavity;

a flexible circuit located in the central cavity, the flexible circuit having a first antenna feed and a second antenna feed;

a ground plane located in the central cavity;

a first antenna element coupled to the first antenna feed, the first antenna element including a first ground short stub coupled to the ground plane, the first antenna element including a first radiating element defining an omnidirectional radiation pattern, the first radiating element including a first main segment coupled to the spherical substrate and extending along at least one of the outer surface or the inner surface, the first main segment following a first arcuate path;

a second antenna element coupled to the second antenna feed, the second antenna element including a second ground short stub coupled to the ground plane, the second antenna element including a second radiating element defining an omnidirectional radiation pattern, the second radiating element including a second main segment coupled to the spherical substrate and extending along at least one of the outer surface or the inner surface, the second main segment following a second arcuate path oriented parallel to the first arcuate path.

13. The antenna module of claim 12, wherein the first and second antenna elements have a transmission coefficient lower than −10 dB.

14. The antenna module of claim 12, wherein the first antenna element and the second antenna element are one of wire antenna elements or stamped and formed antenna elements coupled to the outer surface or the inner surface of the spherical substrate.

15. The antenna module of claim 12, wherein the first antenna element and the second antenna element are LDS antenna elements formed on the outer surface or the inner surface of the spherical substrate.

16. The antenna module of claim 12, wherein the first antenna element and the second antenna element are one of wire antenna elements or stamped and formed antenna elements, the spherical substrate being insert molded around the first antenna element and the second antenna element.

17. The antenna module of claim 12, wherein the first and second radiating elements are provided on a spherical envelope surrounding the flexible circuit and the ground plane.

18. An antenna module comprising:

a flexible circuit forming a volumetric space having an interior volume, the flexible circuit being wrapped at least partially around the interior volume, the flexible circuit having a first antenna feed and a second antenna feed;

a ground plane wrapped at least partially around the interior volume;

a battery in the interior volume and electrically connected to the flexible circuit;

a first antenna element coupled to the first antenna feed, the first antenna element including a first ground short stub coupled to the ground plane, the first antenna element including a first radiating element defining an omnidirectional radiation pattern, the first radiating element including a first main segment extending along a first arcuate path surrounding the interior volume;

a second antenna element coupled to the second antenna feed, the second antenna element including a second ground short stub coupled to the ground plane, the second antenna element including a second radiating element defining an omnidirectional radiation pattern, the second radiating element including a second main segment extending along a second arcuate path surrounding the interior volume, the second arcuate path oriented parallel to the first arcuate path;

wherein the first and second antenna elements have a transmission coefficient lower than −10 dB.

19. The antenna module of claim 18, wherein the first and second radiating elements are provided on a spherical envelope surrounding the interior volume, the flexible circuit and the ground plane being contained within the spherical envelope.

20. The antenna module of claim 18, wherein the first arcuate path extends a first arc length of a first circle.

* * * * *